United States Patent [19]

Schroeder et al.

[11] 3,920,419
[45] Nov. 18, 1975

[54] METHOD OF REMOVING AMMONIA FROM AMMONIA CONTAINING LIQUOR

[75] Inventors: James W. Schroeder, Parma; Anthony C. Naso, Cleveland, both of Ohio

[73] Assignee: Republic Steel Corporation, Cleveland, Ohio

[22] Filed: Apr. 10, 1974

[21] Appl. No.: 459,461

[52] U.S. Cl.......................................... 55/70; 55/18
[51] Int. Cl.²......................................... B01D 19/00
[58] Field of Search ............... 55/18, 30, 53, 54, 19, 55/70, 69, 20, 226; 423/356, 357

[56] References Cited
UNITED STATES PATENTS

| | | | |
|---|---|---|---|
| 2,014,374 | 9/1935 | Brill | 423/356 |
| 3,428,426 | 2/1969 | Carney et al. | 55/54 X |
| 3,460,319 | 8/1969 | Tkach | 55/19 |
| 3,804,757 | 4/1974 | Ruschenburg | 55/70 X |

Primary Examiner—John Adee
Assistant Examiner—Ethel R. Cross
Attorney, Agent, or Firm—Watts, Hoffmann, Fisher & Heinke

[57] ABSTRACT

Free and fixed ammonia values are removed from ammonia liquor by a process which in the preferred embodiment includes the characterizing steps of: (1) automatically adjusting the pH of the liquor by the continuously controlled addition of caustic soda solution in an amount sufficient to maintain a minimum pH of 10.5, (2) stripping ammonia from the liquor by counterflowing air through a packed column at a temperature of from 140°–180°F., and (3) controlling the flow of the air in direct relation to the amount of feed liquor so that at least 99% of the ammonia is removed from the liquor, the most preferred flow rate of the air being in the range of from about 50–100 cubic feet per gallon of feed liquor. The ammonia containing air is withdrawn from the column and the ammonia is extracted from the air in an acid absorber, preferably using a sulfuric acid solution having a pH of from 0.5–1.5. The air from the acid absorber is recycled to the column in a closed system.

11 Claims, 1 Drawing Figure

U.S. Patent  Nov. 18, 1975  3,920,419
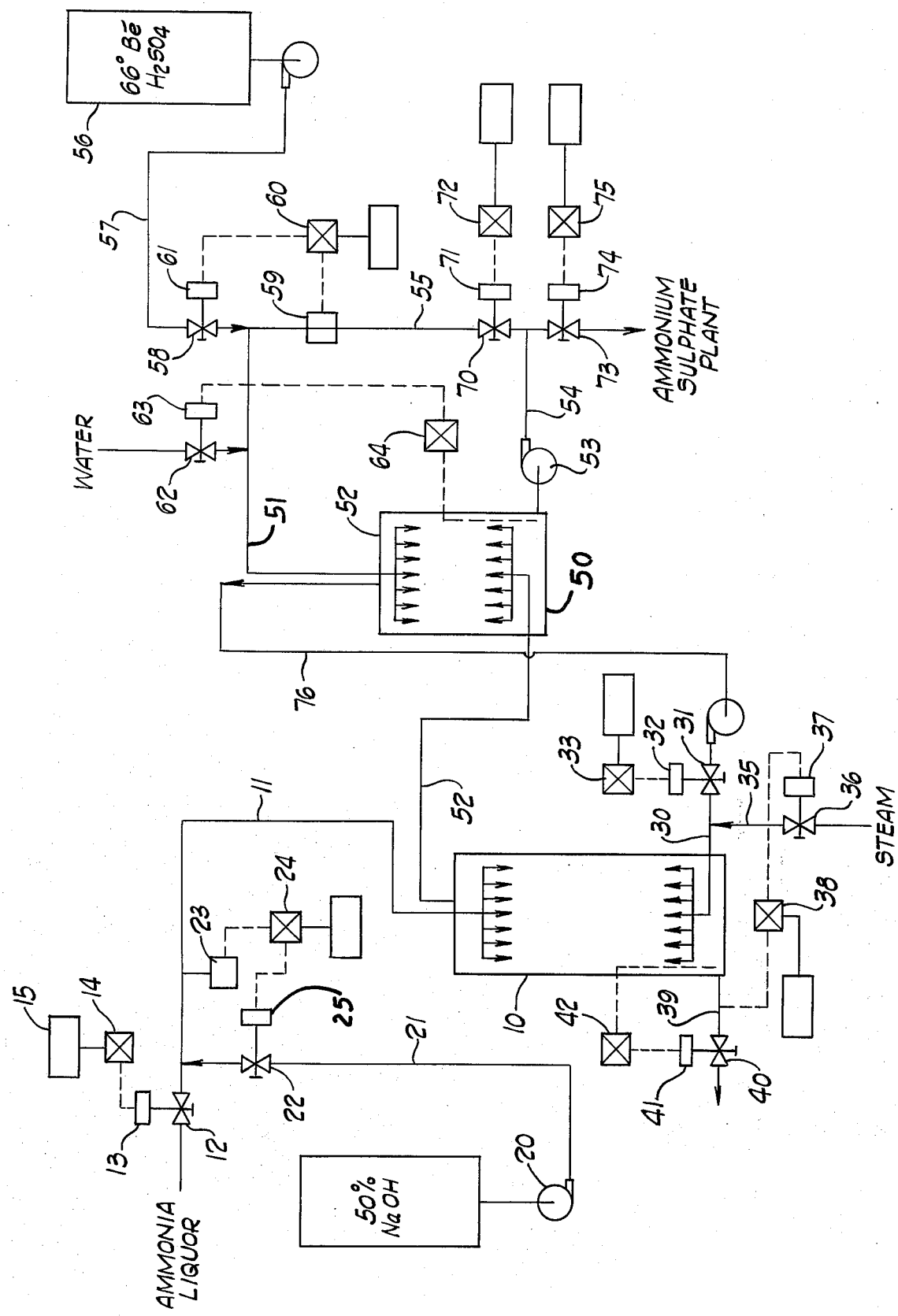

METHOD OF REMOVING AMMONIA FROM AMMONIA CONTAINING LIQUOR

BACKGROUND OF THE INVENTION

The present invention relates generally to the separation of ammonia from liquors, and more specifically to a new and improved process for stripping free and fixed ammonia values from coke plant ammonia liquor and the like.

Semi-direct and indirect processes of free and fixed ammonia removal have commonly involved steam distillation and treatment with lime. In a conventional lime still, the ammonia liquor to be treated is introduced into the top of the column and flows down through a free leg in which the free ammonia values are driven off by a countercurrent flow of steam. The liquor flowing to the bottom of the free leg is drawn into a lime leg and a 3 to 10% milk of lime slurry is added to the hot liquor to convert fixed ammonia to the free state. The hot slurry is then charged back to a fixed leg of the still where the free ammonia values are stripped by upwardly flowing steam. The use of lime to spring the ammonia and the use of steam as the stripping medium is inefficient and has several other operational disadvantages.

Because of the insolubility of lime in water, especially at the high temperatures and pH required to convert the fixed ammonia to free, all of the ammonia cannot be easily converted to the free state in a lime still so that only part of the ammonia is available for stripping. For example, the solubility of lime in water at 200°F. is about 400 milligrams per liter. This dissolved lime will free only about 250 milligrams per liter of fixed ammonia. As the ammonia is stripped and more lime dissolves, the calcium ion concentration in the liquor increases to a level at which very little lime dissolves due to the law of mass action. As a result, the conventional lime still is seldom effective to reduce the ammonia content below about 100 milligrams per liter.

Due to the poor solubility of lime in water and the manner in which it is necessary to add the milk of lime to a conventional still, it has been difficult, if not impossible, accurately to control the pH of the process with automatic process controls. The lack of accurate process controls has increased operating costs because of large excess amounts of lime which are used and because of the labor involved, such as an ammonia stillman, etc.

A lime sludge by-product is produced in the conventional lime still which presents disposal difficulties. Another problem is that the calcium ion can react with the carbonate ion on the distillation plates in the column to effectively foul it. This requires periodic shutdown of the still for cleaning and usually requires the provision of a second still which can be placed in service when the other one is being cleaned.

The conventional use of steam as the stripping medium and to preheat the ammonia liquor and lime slurry to the usual operating temperatures of about 220°F. requires a large amount of heat. The volume of the effluent from a lime still is increased by the use of steam for stripping coupled with the use of the dilute milk of lime slurry and in some cases can be as much as 140% of the feed volume. The use of steam has the further disadvantage of increasing the load on a dephlegmator and requires the condensate to be refluxed, thereby increasing operating costs.

In order to avoid some of these disadvantages of conventional distillation processes, it has been proposed to use heated air to strip ammonia from liquors. Such a proposal is disclosed, for example, in U.S. Pat. No. 1,943,345. It has also been proposed to use caustic soda in certain processes for removing ammonia from liquors, as disclosed, for example, in U.S. Pat. Nos. 3,428,426 and 3,594,987. In spite of such developments, the art has not provided a complete, commercially accepted process for separating ammonia from coke plant liquors which avoids all of the disadvantages associated with the conventional practice of live steam distillation and treatment with lime.

SUMMARY OF THE INVENTION

An object of the present invention is to provide a new and improved process of removing free and fixed ammonia from liquors.

A more specific object of the present invention is to provide a process which is effective to remove more than 99% of the ammonia values from the ammonia liquor effluent of coke producing operations.

A further object of the present invention is to provide a new and improved process of removing ammonia from liquors which can be accurately and automatically controlled.

Another object of the present invention is to provide a new and improved process of removing ammonia from liquors which is effective to reduce capital and operating costs.

The foregoing objects are attained and the disadvantages of the prior art are overcome by a process comprising the steps of adjusting the pH of an ammonia liquor by the addition of caustic soda, stripping the ammonia from the liquor in a packed column, and controlling the temperature of the column and the flow of the stripping medium in relation to the amount of feed liquor so that at least 99% of the ammonia is removed from the liquor. In the preferred embodiment of the invention, the pH of the feed ammonia liquor is automatically adjusted to be at least 10.5 and more preferably in the range of from about 10.5 to 11.5 by the controlled addition of caustic soda solution. The feed liquor of adjusted pH is introduced into the packed column and the ammonia is stripped by counterflowing air at a temperature of from about 140°–180°F. The air flow through the column is controlled to be in the range of from about 40 to 180 cubic feet per gallon of feed liquor, and more preferably is in a range of from about 50 to 100 cubic feet per gallon of feed liquor.

The liquid effluent from the column is underflowed to exhaust and the ammonia containing air is passed through an acid absorbing system to extract the ammonia from the air. In the disclosed embodiment of the invention, the ammonia containing air is passed through a sulfuric acid absorber in which the pH of the sulfuric acid solution is controlled to be in the range from about 0.5 to 1.5, while the concentration of ammonium sulfate in the solution blowdown is controlled to be about 20 to 35% by weight. The air from the absorber is recycled to the column or stripper in a closed system which reduces energy requirements and operating costs. In addition to reducing energy requirements, the recycling of the air in a closed system substantially eliminates problems of air pollution.

The new process is under complete automatic control using pH, flow and temperature controllers. This automatic process control is made possible by using caustic soda to control the pH of the liquor before it is introduced into the column. By controlling the pH of the liquor through automatic adjustment of the caustic flow, the amount of excess caustic soda is minimized to an average of 2% or less. The improved process control also eliminates the need for an ammonia stillman and for the manpower heretofore required to slake and mix lime, etc.

The system of this invention also provides more efficient ammonia removal than prior art systems involving treatment with lime. In contrast to lime, caustic soda is completely soluble in ammonia liquor so that substantially all of the fixed ammonia can be changed to the free state before entering the column, thus releasing nearly all of the ammonia in the liquor for stripping. The efficiency of the stripping operation is further enhanced by the presence of sodium chloride which is the end product of the caustic addition. Sodium chloride increases the partial pressure of ammonia so that it prefers the gaseous rather than the liquid state. As will be apparent from the following detailed discussion, operation of the new system of this invention is effective to insure 99% or more reduction of ammonia and to provide good control of the caustic addition to a low excess level of 2% plus or minus 1%.

In some instances, as when steam is readily available or because of the nature of the liquor being treated, it is possible to employ steam as the stripping medium and to attain many of the advantages described herein by the expedients of using caustic soda additions to automatically adjust the pH of the feed liquor and carefully controlling the flow of the steam in direct relation to the amount of feed liquor. Preferably, however, the invention contemplates the use of air instead of steam. The preferred use of air as the stripping medium in the process of the present invention materially reduces energy requirements and consequently reduces operating costs. Steam is used only to humidify the air and to operate the column at a preferred temperature in the range of from 140°–180°F. By operating the column at the indicated temperature, the steam heretofore required to heat the liquor to the boiling point is eliminated. Also, no steam is required to heat the alkaline solution to the boiling point of the liquor. The low energy requirements of the new system are enhanced by recycling the air from the acid absorber and by using the heat given up in the reactions of fixed ammonia with caustic soda and ammonia gas with sulfuric acid.

Another advantage of the preferred use of air is that the effluent volume from the column is reduced. In the preferred operation, a 50% caustic soda solution is used to spring the ammonia from the liquor in place of the conventional 3 to 10% milk of lime. The equivalent alkalinity of one gallon of 50% caustic soda solution is about 20 gallons of 3% milk of lime. The effluent volume is further reduced by the reduced steam consumption discussed above.

Other advantages of the new ammonia removal process of this invention include lower capital costs and elimination of the calcium ion. Since the stripper is operated at a relatively low temperature of from 140° to 180°F., it can be construed of conventional fiberglass reinforced plastics and a lightweight plastic packing can be used. Since the calcium ion is eliminated, there is no need for the conventional, periodic shutdowns for cleaning.

Still other objects, advantages and a fuller understanding of the invention will be had from the following detailed description and the accompanying drawing.

BRIEF DESCRIPTION OF THE DRAWING

The drawing diagrammatically illustrates an exemplary, preferred equipment arrangement and flow scheme for the process of the present invention.

DESCRIPTION OF THE PREFERRED EMBODIMENT

The invention is particularly applicable to the stripping of ammonia from the ammonia liquor resulting from coking operations. Ammonia liquor constitutes the condensed water vapor separated from the tar in a tar plant along with the flushing liquor and contains free and fixed ammonia in typical amounts of 5,000 parts or more per million. The process of the invention is effective to reduce this ammonia content by more than 99% to less than 50 parts per million.

Referring to the flow sheet which schematically illustrates a preferred example of the invention, the ammonia liquor is introduced into the top of a packed column 10 through a line 11. The new process is such that the column 10 can be constructed of ordinary fiberglass reinforced plastic, thereby reducing the capital costs compared to conventional lime stills. The packing in the column 10 may be of any conventional type, such as plastic rings, saddles, etc. The flow of the ammonia liquor through the line 11 to the column 10 is automatically controlled by a flow control process valve 12. The flow control valve 12 includes a pneumatic actuator 13 which is operated by a signal from a flow indicator control and recorder 14.

In order to convert the fixed ammonia to the free state, the pH of the feed liquor is adjusted by the addition of a 50% by weight caustic soda solution so that the pH is at least 10.5 and is preferably in the range of from 10.5 to 11.5 The caustic soda solution is pumped by a pump 20 through a line 21 which connects with the line 11. The flow of caustic soda to achieve the desired pH is automatically adjusted by a flow control process valve 22. The automatic controls for the caustic soda solution include electrodes (not shown) which are contacted by the ammonia liquor. The electrodes produce a potential corresponding to the pH of the ammonia liquor and this potential is changed to a pressure impulse by suitable transducers 23. The signal from the transducers 23 is connected to a pressure indicator control and recorder 24 which operates a pneumatic actuator 25 for the valve 22. This arrangement is such that the flow of caustic solution into the feed ammonia liquor is continuously adjusted to maintain the desired pH which is necessary to convert the fixed ammonia to the free state and to minimize an excess of caustic. The system can be precisely controlled so that the excess caustic in the effluent from the column 10 averages 2% by weight or less.

The feed ammonia liquor flows downwardly through the packed column 10 and the ammonia is stripped by concurrently counterflowing air at a preferred temperature of from 140°–180°F. The air is introduced into the bottom of the column through a line 30. The flow of air is controlled by a flow control valve 31 operated by a pneumatic actuator 32 and a flow indicator control and recorder 33. The temperature of the air in the column is adjusted to be within the desired range of from 140° to 180°F. by controllably admitting steam through a line 35 to the air line 30. The flow of steam through the line 35 is automatically controlled by a process valve 36 operated by a pneumatic actuator 37 and a temperature indicator control and recorder 38. The temperature indicator control and recorder 38 is connected to the effluent line 39 so that the device senses the temperature of the effluent in the line 39 and operates the valve 36 to admit the necessary amount of steam to maintain the desired operating temperature in the column.

The flow of air through the column is controlled in direct relation to the amount of feed liquor so as to reduce the ammonia content by at least 99%. A practical operating range is from about 40–180 cubic feet per gallon of feed liquor, and the preferred range is from about 50–100 cubic feet per gallon. Higher flow rates are possible, but it has been found that the amount of ammonia removed from the liquor is not significantly affected by increasing the flow rate above the preferred maximum limit of about 100 cubic feet per gallon.

The effluent from the column 10 is underflowed through the line 39 to exhaust. As shown, the flow of effluent in the line 39 is automatically controlled by a valve 40 operated by a pneumatic actuator 41 and a liquid level control 42 which senses the liquid level in the column. A simple U-seal can replace the liquid level control instruments where applicable.

The ammonia containing gas from the top of the column 10 is passed through a suitable acid absorbing system for extraction of the ammonia. In the illustrated example of the invention, the acid absorbing system comprises a sulfuric acid absorber 50. A sulfuric acid solution is introduced into the top of the absorber 50 through a line 51, while the ammonia containing gas is introduced into the bottom of the absorber through a line 52 and flows upwardly in contact with the acid solution. The effluent from the absorber 50 is extracted by a pump 53 and is recirculated through a line 54 which is connected by a line 55 to the inlet line 51. The pH of the recirculated solution is maintained in the range of from 0.5 to 1.5 by the addition of concentrated (66° Be) sulfuric acid supplied from a source 56 through a line 57 to the line 51. The flow of the sulfuric acid into the line 51 is regulated by a flow control valve 58. Suitable electrodes and transducers 59 are connected to the line 55, and the signal from the transducers is transmitted to a pressure controller and regulator 60 which in turn operates a pneumatic actuator 61 for the valve 58. Water is automatically added to the recirculated acid solution through a valve 62 operated by a pneumatic actuator 63. The pneumatic actuator 63 is automatically controlled by a liquid level control 64 which senses the level of liquid in the absorber 50.

The flow of the recirculated acid solution in the lines 51, 54, 55 is regulated by a flow control valve 70. This flow control valve 70 is operated by a pneumatic actuator 71 under the control of a flow indicator control and recorder 72.

The acid solution is recirculated through the absorber so that the concentration of ammonium sulfate in the solution is in the range of from 20 to 35% by weight. The blowdown from the absorber system is pumped to an ammonium sulfate plant or the like through a flow control valve 73. The valve 73 is similar to the valve 70 and is operated by a pneumatic actuator 74 which is controlled by a flow indicator control and recorder 75.

As shown in the drawing, the air from the absorber 50 is recycled to the bottom of the column 10 through the line 76 in a closed system. This closed system in which the air from the absorber is recirculated to the column further reduces the amount of energy required to maintain the column at its operating temperature.

Coke plant ammonia liquor having an ammonia content ranging from about 4,000–6,500 milligrams per liter was treated in a system as illustrated in the drawing designed for a feed of 75 gallons per minute. The pH of the feed liquor was adjusted to be in the range of from 11 to 11.5 by the addition of a 50% caustic soda solution, and the packed column was operated at a temperature of from about 155°–170°F. The following table lists various flow rates of the liquor and air though the column and the corresponding amounts of ammonia in the effluent.

| REMOVAL OF AMMONIA FROM AMMONIA LIQUOR | | | | | | |
|---|---|---|---|---|---|---|
| | | Air Flow | | Ammonia (mg/l) | | |
| Temp(°F) | Liquor Flow(GPM) | Actual Cubic Feet/Minute | Actual Cubic Feet/Gallon | Influent | Effluent | Packing |
| 160 | 70 | 3600 | 51 | ~6500 | 440 | Saddles |
| 160 | 20 | 3000 | 150 | do. | 24 | " |
| 160 | 30 | 3000 | 100 | do. | 25 | " |
| 160 | 18 | 3200 | 180 | do. | 27 | " |
| 160 | 18 | 3000 | 170 | do. | 22 | " |
| 160 | 18 | 3200 | 180 | do. | <20 | " |
| 160 | 35 | 3600 | 100 | ~5000 | 27 | " |
| 160 | 35 | 3600 | 100 | do. | 97 | " |
| 160 | 35 | 2800 | 80 | do. | <20 | " |
| 160 | 35 | 3200 | 92 | do. | <20 | " |
| 160 | 70 | 3200 | 46 | do. | 470 | " |
| 160 | 35 | 3200 | 92 | do. | 84 | " |
| 160 | 35 | 3200 | 92 | do. | 66 | " |
| 170 | 75 | 4000 | 53 | ~4000 | 61 | Rings |
| 170 | 75 | 4000 | 53 | do. | 55 | " |
| 170 | 75 | 4000 | 53 | do. | 45 | " |
| 157 | 75 | 4000 | 53 | do. | 160 | " |
| 155 | 75 | 4000 | 53 | do. | 210 | " |
| 175 | 75 | 3800 | 51 | do. | 40 | " |
| 175 | 60 | 4000 | 67 | do. | <20 | " |
| 170 | 60 | 4000 | 67 | do. | 20 | " |

Many variations and modifications of the invention will be apparent to those skilled in the art in light of the foregoing detailed disclosure. Therefore, it is to be understood that, within the scope of the appended claims, the invention can be practiced otherwise than as specifically shown and described.

What is claimed is:

1. A method of removing ammonia from an ammonia containing liquor comprising the steps of:
   a. feeding the liquor to the top of a packed column;
   b. automatically monitoring the pH of the feed liquor;
   c. automatically adding caustic soda in controlled amounts to the feed liquor prior to introduction into the column to maintain a minimum pH of 10.5;
   d. counterflowing a gaseous stripping median through the column at the minimum temperature of about 140°F;
   e. regulating the flow of the feed liquor to the column; and
   f. controlling the flow of the stripping medium in direct relation to the amount of feed liquor so that at least 99% of the ammonia is removed from the liquor.

2. A method as claimed in claim 1 in which the flow rate of the stripping median is controlled to be at least 40 cubic feet per gallon of feet liquor.

3. A method as claimed in claim 4 including the steps of:
   e. withdrawing ammonia containing air from the column;
   f. removing the ammonia from the air; and
   g. thereafter recycling the air to the column in a closed system for further stripping of ammonia.

4. A method of removing ammonia from an ammonia containing liquor comprising the steps of:
   a. feeding the liquor to an extraction column;
   b. automatically monitoring the pH of the feed liquor;
   c. automatically adding caustic soda solution to the feed liquor prior to introduction into the column to maintain a minimum pH of 10.5;
   d. counterflowing air through the column at a flow rate controlled to be at least about 40 cubic feet per gallon of feet liquor to strip the ammonia; and
   e. automatically sensing the operating temperature of the column and heating the air to maintain the operating temperature in a range from about 140°–180° F.

5. A method as claimed in claim 4 including the steps of:
   f. withdrawing ammonia containing air from the column;
   g. extracting the ammonia from the air by acid absorption; and
   h. recycling the air to the column in a closed system.

6. A method of removing ammonia from an ammonia containing liquor comprising the steps of:
   a. feeding the liquor to the top of a packed column;
   b. automatically monitoring the pH of the feed liquor and maintaining the pH in a range of from 10.5–11.5 by the controlled addition of caustic soda solution prior to introducing the liquor into the column;
   c. counterflowing air through the column at a rate controlled to be at least at about 40 cubic feet per gallon of feet liquor to strip the ammonia;
   d. withdrawing liquid effluent from the bottom of the column; and
   e. maintaining the operating temperature of the column in the range from about 140°–180°F by automatically heating the air in response to the temperature of the liquid effluent.

7. A method of removing ammonia from an ammonia containing liquor comprising the steps of:
   a. adjusting the pH of the liquor to at least 10.5 by the addition of caustic soda solution;
   b. feeding the liquor of adjusted pH to the top of a packed column;
   c. controlling air through the column at a rate of at least about 40 cubic feet per gallon of feet liquor to strip the ammonia;
   d. maintaining the operating temperature of the column in a range from about 140°–180°F.
   e. conducting ammonia containing air from the column to a sulfuric acid absorber; and
   f. extracting ammonia from the air in the absorber with sulphuric acid solution having a pH of at least about 0.5.

8. A method as claimed in claim 7 including the step of recycling air from the absorber to the column in a closed system for further stripping.

9. A method as claimed in claim 7 including the step of blowing down an effluent solution from the absorber having an ammonium sulfate concentration of from 20–35% by weight.

10. A method of removing ammonia from an ammonia containing liquor comprising the steps of:
    a. automatically adjusting the pH of the liquor to a range of from 10.5–11.5 by monitoring the pH and controllably adding caustic soda solution in response to the monitored pH;
    b. feeding the liquor to the top of a packed column;
    c. counterflowing air through the column at a flow rate of at least about 40 cubic feet per gallon of feet liquor to strip the ammonia;
    d. withdrawing liquid effluent from the column;
    e. maintaining and operating temperature in the column from about 140°–180°F. by heating the air in response to the temperature of the effluent;
    f. withdrawing ammonia containing air from the column and conducting it to a sulfuric acid absorber;
    g. extracting ammonia from the air in the absorber with a sulfuric acid solution adding a pH of at least about 0.5; and
    h. recycling air from the absorber to the column in a closed system.

11. A method as claimed in claim 10 including the step of blowing down an effluent solution from the absorber having an ammonium sulfate concentration of from 20–35% by weight.

* * * * *

UNITED STATES PATENT AND TRADEMARK OFFICE
CERTIFICATE OF CORRECTION

PATENT NO. : 3,920,419
DATED : November 18, 1975
INVENTOR(S) : James W. Schroeder and Anthony C. Naso It is certified that error appears in the above-identified patent and that said Letters Patent are hereby corrected as shown below:

In the Claims:

Claim 1 (column 7, line 11) "median" should be -- medium --.

Claim 2 (column 7, line 21) "median" should be -- medium --.

Claim 3 (column 7, line 25) "e." should be -- f. --;
(column 7, line 27) "f." should be -- g. --;
(column 7, line 28) "g." should be -- h. --.

Signed and Sealed this sixth Day of April 1976

[SEAL]

Attest:

RUTH C. MASON
*Attesting Officer*

C. MARSHALL DANN
*Commissioner of Patents and Trademarks*